United States Patent
Uchio et al.

(10) Patent No.: US 12,458,679 B2
(45) Date of Patent: Nov. 4, 2025

(54) COMPOSITION FOR INHIBITING TNF-α OR IL-6 PRODUCTION

(71) Applicant: House Wellness Foods Corporation, Hyogo (JP)

(72) Inventors: Ryusei Uchio, Itami (JP); Koutarou Muroyama, Itami (JP); Kengo Kawasaki, Itami (JP); Shinji Murosaki, Itami (JP)

(73) Assignee: House Wellness Foods Corporation, Hyogo (JP)

( * ) Notice: Subject to any disclaimer, the term of this patent is extended or adjusted under 35 U.S.C. 154(b) by 889 days.

(21) Appl. No.: 17/624,532

(22) PCT Filed: Jun. 29, 2020

(86) PCT No.: PCT/JP2020/025570
§ 371 (c)(1),
(2) Date: Jan. 3, 2022

(87) PCT Pub. No.: WO2021/002334
PCT Pub. Date: Jan. 7, 2021

(65) Prior Publication Data
US 2022/0241365 A1    Aug. 4, 2022

(30) Foreign Application Priority Data
Jul. 1, 2019   (JP) .................. 2019-122941

(51) Int. Cl.
*A61K 36/9066* (2006.01)
*A61K 31/12* (2006.01)
*A61P 37/06* (2006.01)

(52) U.S. Cl.
CPC .......... *A61K 36/9066* (2013.01); *A61K 31/12* (2013.01); *A61P 37/06* (2018.01)

(58) Field of Classification Search
None
See application file for complete search history.

(56) References Cited

U.S. PATENT DOCUMENTS

2004/0126442 A1   7/2004   Quintanilla Almagro et al.
2011/0257126 A1*  10/2011  Neven .................... A61P 25/28
                                                              536/46

FOREIGN PATENT DOCUMENTS

| CN | 1956713 A | 5/2007 |
| EP | 1 752 144 A1 | 5/2005 |
| JP | 2003-509464 A | 3/2003 |
| JP | 2009-242261 A | 10/2009 |
| JP | 2015-051970 A | 3/2015 |
| WO | 2020/004357 A1 | 1/2020 |

OTHER PUBLICATIONS

Kawasaki et al. (Effect of a combination of hot water extract of curcuma longa . . . , Japanese Pharmacology and Thereaputics, 2017, vol. 45. No 2. P. 243-252). (Year: 2017).*

Office Action issued in corresponding Chinese Patent Application No. 202080047802.1 dated Aug. 9, 2023.

Kawasaki et al., "Effect of a combination of hot water extract of curcuma longa and curcumin on serum liver enzymes, Inflammatory markers, and emotional states in healthy participants with moderately high body mass index—A randomized, double-blind, placebo-controlled clinical trial," Japanese Pharmacology and Therapeutics, 45 (2): 243-252 (2017).

Agarwal et al., "Topically applied standardized aqueous extract of curcuma longa linn, suppresses endotoxin-induced uveal inflammation in rats," Indian Journal of Experimental Biology, 51 (10): 797-803 (2013).

Uchio et al., "Hot water extract of turmeric (*Curcuma longa*) prevents non-alcoholic steatohepatitis in mice by inhibiting hepatic oxidative stress and inflammation," Journal of Nutritional Science, 7: e36 (2018).

Asada et al., "Effects of hot water extract of curcuma longa on human epidermal keratinocytes in vitro and skin conditions in healthy participants: A randomized, double-blind, placebo-controlled trial," Journal of Cosmetic Dermatology, 18 (6): 1866-1874 (2019).

Nada et al., "Radioprotective effect of curcuma longa extract on y-irradiation-incuded oxidative stress in rats," Canadian Journal of Physiology and Pharmacology, 90 (4): 415-423 (2012).

Uchio et al., "Hot water extract of *Curcuma longa* L. improves serium inflammatory markers and general health in subjects with overweight or prehypertension/mild hypertension: a randomized double-blind, placebo-controlled trial," Nutrients, 11 (8) (2019).

Okuda-Hanafusa et al., "Turmeronol A and turmeronol B from curcuma longa prevent inflammatory mediator production by lipopolysaccharide-stimulated RAW264.7 macrophages, partially via reduced NF-/kB signaling," Food & Function, 10 (9): 5779-5788 (2019).

(Continued)

*Primary Examiner* — Melissa S Mercier
(74) *Attorney, Agent, or Firm* — Morgan, Lewis & Bockius LLP

(57) ABSTRACT

One or more embodiments of the present invention provide a composition for inhibiting TNF-α or IL-6 production, comprising a component derived from turmeric. One or more embodiments of the present invention relate to a composition for inhibiting TNF-α or IL-6 production, comprising at least one of turmeronol A, turmeronol B, and bisacurone. The composition for inhibiting TNF-α or IL-6 production according to one or more embodiments of the present invention may comprise 20 μg or more of turmeronol A and turmeronol B in total per daily intake, may comprise 17 μg or more of turmeronol A per daily intake, may comprise 5 μg or more of turmeronol B per daily intake, and may comprise 80 μg or more of bisacurone per daily intake.

18 Claims, 2 Drawing Sheets

(56) References Cited

OTHER PUBLICATIONS

Dimitris Tousoulis, Christodoulos Stefanadis, Biomarkers in Cardiovascular Diseases, 72-73 (2013).
Today's Laboratory Test, 14th ed., Nankodo Co., Ltd., 278-279 (2015-2016) (see partial English translation).
International Search Report issued in corresponding International Patent Application No. PCT/JP2020/025570 dated Aug. 18, 2020.

* cited by examiner

COMPOSITION FOR INHIBITING TNF-α OR IL-6 PRODUCTION

TECHNICAL FIELD

One or more embodiments of the present invention relate to a composition for inhibiting TNF-α or IL-6 production.

One or more embodiments of the present invention relate to use of at least one of turmeronol A, turmeronol B, and bisacurone, or a turmeric extract, for production of a composition for inhibiting TNF-α or IL-6 production.

One or more embodiments of the present invention relate to use of at least one of turmeronol A, turmeronol B, and bisacurone (active compound), or a component of a turmeric extract comprising the active compound, for production of a medicament for inhibiting TNF-α or IL-6 production.

One or more embodiments of the present invention relate to a method for inhibiting TNF-α or IL-6 production.

One or more embodiments of the present invention relate to the active compound or the turmeric extract for inhibiting TNF-α or IL-6 production.

BACKGROUND ART

Tumor necrosis factor α (TNF-α) and interleukin 6 (IL-6) are proteins that are produced by a wide variety of cells and have molecular weights of 17 kDa and 26 kDa, respectively. Both proteins have many bioactive effects, but are each known to be a risk factor for cardiovascular diseases (Non Patent Literature 1).

Turmeric extracts are known to have various bioactivities.

Patent Literature 1 discloses that a composition comprising a turmeric extract containing approximately 95% of curcuminoid together with additional plant extracts inhibited lipopolysaccharide (LPS)-induced TNF-α release and IL-6 release in RAW264.7 cells.

Patent Literature 2 discloses that an aqueous extract of turmeric and an aqueous alcoholic extract of turmeric have an effect of inhibiting secretion of the cytokine IL-6 and/or IL-8 with an activity similar to that of betamethasone-17-valerate in culture of human keratinocytes.

Patent Literature 3 describes an anti-inflammatory agent comprising an extract of fermented turmeric, and discloses that the extract of fermented turmeric inhibited production of TNF-α in RAW264.7 cells in the presence of lipopolysaccharide (LPS).

Non Patent Literature 2 discloses that administration of a water extract of turmeric to rats for 28 days inhibited release of TNFα and IL-6 induced by gamma-irradiation in the rats.

CITATION LIST

Patent Literature

Patent Literature 1: JP Patent Publication (Kokai) No. 2015-051970 A
Patent Literature 2: JP Patent Publication (Kohyo) No. 2003-509464 A
Patent Literature 3: JP Patent Publication (Kokai) No. 2009-242261 A

Non Patent Literature

Non Patent Literature 1: Dimitris Tousoulis, Christodoulos Stefanadis. (2013) Biomarkers in Cardiovascular Diseases. CRC Press, pp. 72-73
Non Patent Literature 2: Can. J. Physiol. Pharmacol., 2012 April; 90(4): 415-23
Non Patent Literature 3: Today's Laboratory Test (original title in Japanese: Konnichi no Rinsho-Kensa) 2015-2016, 14th ed. (Nankodo Co., Ltd.), pp. 278-279

SUMMARY OF INVENTION

Technical Problem

One or more embodiments of the present invention provide a composition effective for inhibiting production of TNF-α or IL-6.

Solution to Problem

The present inventors have found that concentrations of TNF-α and IL-6 in blood significantly decreased in humans who had ingested tablets each comprising a turmeric extract comprising turmeronol A, turmeronol B, and bisacurone every day for 12 weeks. This has led to the completion of one or more embodiments of the present invention described below.

(1) A composition for inhibiting TNF-α or IL-6 production, comprising at least one of turmeronol A, turmeronol B, and bisacurone.

(2) The composition for inhibiting TNF-α or IL-6 production according to (1), wherein the composition comprises a turmeric extract comprising the at least one of turmeronol A, turmeronol B, and bisacurone and extracted with at least one extraction solvent selected from the group consisting of water and a hydrophilic organic solvent.

(3) A composition for inhibiting TNF-α or IL-6 production, comprising a turmeric extract comprising at least one of turmeronol A, turmeronol B, and bisacurone and extracted with at least one extraction solvent selected from the group consisting of water and a hydrophilic organic solvent.

(4) The composition for inhibiting TNF-α or IL-6 production according to (2) or (3), wherein the extraction solvent is water.

(5) The composition for inhibiting TNF-α or IL-6 production according to any one of (2) to (4), wherein the turmeric extract is not an extract of fermented turmeric.

(6) The composition for inhibiting TNF-α or IL-6 production according to any one of (1) to (5), for inhibiting systemic production of TNF-α or IL-6.

(7) The composition for inhibiting TNF-α or IL-6 production according to any one of (1) to (6), for inhibiting production of TNF-α or IL-6 in a human with 0.3 mg/dL or less of blood CRP (c-reactive protein), in particular, in a healthy human with 0.3 mg/dL or less of blood CRP.

(8) The composition for inhibiting TNF-α or IL-6 production according to any one of (1) to (7), wherein the composition comprises 20 μg or more of turmeronol A and turmeronol B in total per daily intake.

(9) The composition for inhibiting TNF-α or IL-6 production according to any one of (1) to (8), wherein the composition comprises 17 μg or more of turmeronol A per daily intake.

(10) The composition for inhibiting TNF-α or IL-6 production according to any one of (1) to (9), wherein the composition comprises 5 μg or more of turmeronol B per daily intake.

(11) The composition for inhibiting TNF-α or IL-6 production according to any one of (1) to (10), wherein the composition comprises 80 μg or more of bisacurone per daily intake.

(12) The composition for inhibiting TNF-α or IL-6 production according to any one of (1) to (11), wherein the content of curcumin is less than 30 mg per daily intake.
(13) Use of at least one of turmeronol A, turmeronol B, and bisacurone, or a turmeric extract comprising at least one of turmeronol A, turmeronol B, and bisacurone and extracted with at least one extraction solvent selected from the group consisting of water and a hydrophilic organic solvent, for production of a composition for inhibiting TNF-α or IL-6 production.
(14) Use of at least one of turmeronol A, turmeronol B, and bisacurone, or a turmeric extract comprising at least one of turmeronol A, turmeronol B, and bisacurone and extracted with at least one extraction solvent selected from the group consisting of water and a hydrophilic organic solvent, for production of a medicament for inhibiting TNF-α or IL-6 production.

In (13) or (14), the composition or medicament is preferably a composition or medicament for treating or preventing a disease or symptom that is ameliorated by inhibiting production of TNF-α or IL-6.
(15) The use according to (13) or (14), wherein the turmeric extract is an extract of turmeric extracted with water.
(16) The use according to any one of (13) to (15), wherein the turmeric extract is not an extract of fermented turmeric.
(17) The use according to any one of (13) to (16), wherein the composition or medicament for inhibiting TNF-α or IL-6 production is a composition or medicament for inhibiting systemic production of TNF-α or IL-6.
(18) The use according to any one of (13) to (17), wherein the composition or medicament for inhibiting TNF-α or IL-6 production is a composition or medicament for inhibiting production of TNF-α or IL-6 in a human with 0.3 mg/dL or less of blood CRP, in particular, in a healthy human with 0.3 mg/dL or less of blood CRP.
(19) The use according to any one of (13) to (18), wherein the composition or medicament for inhibiting TNF-α or IL-6 production comprises 20 μg or more of turmeronol A and turmeronol B in total per daily intake.
(20) The use according to any one of (13) to (19), wherein the composition or medicament for inhibiting TNF-α or IL-6 production comprises 17 μg or more of turmeronol A per daily intake.
(21) The use according to any one of (13) to (20), wherein the composition or medicament for inhibiting TNF-α or IL-6 production comprises 5 μg or more of turmeronol B per daily intake.
(22) The use according to any one of (13) to (21), wherein the composition or medicament for inhibiting TNF-α or IL-6 production comprises 80 μg or more of bisacurone per daily intake.
(23) The use according to any one of (13) to (22), wherein the content of curcumin in the composition or medicament for inhibiting TNF-α or IL-6 production is less than 30 mg per daily intake.
(24) A method for inhibiting TNF-α or IL-6 production, comprising:
administering at least one of turmeronol A, turmeronol B, and bisacurone, or a turmeric extract comprising at least one of turmeronol A, turmeronol B, and bisacurone and extracted with at least one extraction solvent selected from the group consisting of water and a hydrophilic organic solvent, to a subject; and
inhibiting TNF-α or IL-6 production in the subject.
(25) The method according to (24), wherein the turmeric extract is an extract of turmeric extracted with water.
(26) The method according to (24) or (25), wherein the turmeric extract is not an extract of fermented turmeric.
(27) The method according to any one of (24) to (26), wherein the method inhibits systemic production of TNF-α or IL-6 in the subject.
(28) The method according to any one of (24) to (27), wherein the subject is a subject in need of inhibiting TNF-α or IL-6 production or for whom inhibiting TNF-α or IL-6 production is desirable.
(29) The method according to any one of (24) to (28), wherein the subject is a human with 0.3 mg/dL or less of blood CRP, in particular, a healthy human with 0.3 mg/dL or less of blood CRP.
(30) The method according to any one of (24) to (29), wherein 20 μg or more of turmeronol A and turmeronol B in total is administered to the subject per day.
(31) The method according to any one of (24) to (30), wherein 17 μg or more of turmeronol A is administered to the subject per day.
(32) The method according to any one of (24) to (31), wherein 80 μg or more of bisacurone is administered to the subject per day.
(33) The method according to any one of (24) to (31), wherein the daily dose of curcumin is less than 30 mg.
(34) At least one of turmeronol A, turmeronol B, and bisacurone (active compound), or a turmeric extract comprising at least one of turmeronol A, turmeronol B, and bisacurone and extracted with at least one extraction solvent selected from the group consisting of water and a hydrophilic organic solvent, for inhibiting TNF-α or IL-6 production in a subject.
(35) The active compound or turmeric extract according to (34), wherein the turmeric extract is an extract of turmeric extracted with water.
(36) The active compound or turmeric extract according to (34) or (35), wherein the turmeric extract is not an extract of fermented turmeric.
(37) The active compound or turmeric extract according to any one of (34) to (36), wherein the active compound or turmeric extract is used for inhibiting systemic production of TNF-α or IL-6 in a subject.
(38) The active compound or turmeric extract according to any one of (34) to (37), for administering to a subject in need of inhibiting TNF-α or IL-6 production or for whom inhibiting TNF-α or IL-6 production is desirable.
(39) The active compound or turmeric extract according to any one of (34) to (38), for administering to a human with 0.3 mg/dL or less of blood CRP, in particular, to a healthy human with 0.3 mg/dL or less of blood CRP.
(40) The active compound or turmeric extract according to any one of (34) to (39), wherein the active compound or turmeric extract is used for inhibiting TNF-α or IL-6 production by administering 20 μg or more of turmeronol A and turmeronol B in total to the subject per day.
(41) The active compound or turmeric extract according to any one of (34) to (40), wherein the active compound or turmeric extract is used for inhibiting TNF-α or IL-6 production by administering 17 μg or more of turmeronol A to the subject per day.
(42) The active compound or turmeric extract according to any one of (34) to (41), wherein the active compound or turmeric extract is used for inhibiting TNF-α or IL-6 production by administering 5 μg or more of turmeronol B to the subject per day.
(43) The active compound or turmeric extract according to any one of (34) to (42), wherein the active compound or turmeric extract is used for inhibiting TNF-α or IL-6 production by administering 80 µg or more of bisacurone to the subject per day.

(44) The active compound or turmeric extract according to any one of (34) to (43), wherein the active compound or turmeric extract is used for inhibiting TNF-α or IL-6 production by administering to the subject so that the daily dose of curcumin is less than 30 mg.

(45) The active compound or turmeric extract according to any one of (34) to (44), for treating or preventing a disease or symptom that is ameliorated by inhibiting production of TNF-α or IL-6 in the subject.

This description contains the contents disclosed in Japanese Patent Application No. 2019-122941, to which the present application claims priority.

Advantageous Effects of Invention

One or more embodiments of the present invention provide a composition for inhibiting TNF-α or IL-6 production.

DESCRIPTION OF EMBODIMENTS

<Turmeric>

Figure 1:
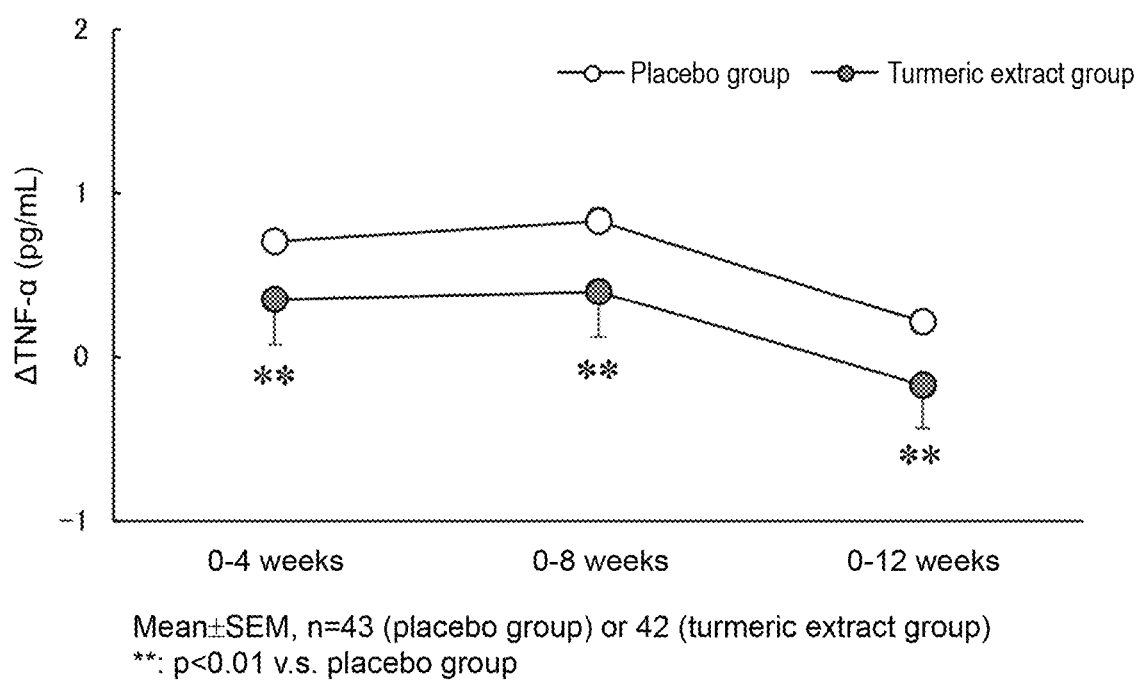
FIG. 1 shows amounts of change in blood TNF-α concentrations in a group with intake of a test food comprising a turmeric extract (turmeric extract group, n=42) and those in a group with intake of a placebo food (placebo group, n=43) from before the intake to 4 weeks, 8 weeks, and 12 weeks after the intake.

In one or more embodiments of the present invention, the term "turmeric" refers to a plant belonging to the genus *Curcuma* in the family Zingiberaceae, and specific examples thereof include *Curcuma longa* (autumn turmeric), *Curcuma aromatica* (spring turmeric), *Curcuma zedoaria*, *Curcuma phaeocaulis*, *Curcuma kwangsiensis*, *Curcuma wenyujin*, and/or *Curcuma xanthorrhiza*. Among these, *Curcuma longa* is particularly preferable.

In one or more embodiments of the present invention, use of a portion of turmeric including the rhizome is preferable.

In one or more embodiments of the present invention, the turmeric is preferably not fermented turmeric.

The form of turmeric for use in one or more embodiments of the present invention is not limited, and may be a crushed product, squeezed juice, or extract of turmeric, or a processed product thereof. Particularly preferable is a turmeric extract. In the following, preferred embodiments of the turmeric extract will be described.

<Turmeric Extract>

In one or more embodiments of the present invention, the term "turmeric extract" refers to an extract of a plant material derived from a plant of the genus *Curcuma* in the family Zingiberaceae, the extract being extracted with an extraction solvent. The turmeric extract is not limited to a solvent extract obtained via extraction with an extraction solvent, and the scope of the turmeric extract includes a resultant of additional fractionation or purification through column chromatography or the like for such a solvent extract. The turmeric extract for use in one or more embodiments of the present invention can be in the form of an extract solution after the completion of an extraction procedure (including a fractionation or purification procedure if fractionation or purification is performed), a concentrate obtained by partially removing the solvent from the extract solution, or a dry matter obtained by removing the solvent from the extract solution. The solvent can be removed from the extract by volatilizing the solvent via, for example, heating and/or decompressing. The methods for such heating and decompressing are not limited, and, for example, known methods can be employed.

Examples of the above plant material include the aforementioned turmeric rhizome. For example, a rhizome of *Curcuma longa* is particularly preferable. The rhizome for use may be one collected from soil. An adequate part of the rhizome in its original form, in pieces obtained by cutting into adequate dimensions or shape, or in the form of a grounded product may be used. The plant material may have been dried, as appropriate.

As an extraction solvent, at least one selected from the group consisting of water and a hydrophilic organic solvent can be used. The at least one extraction solvent selected from the group consisting of water and a hydrophilic organic solvent may be any of water, a hydrophilic organic solvent, and a mixed solvent of water and a hydrophilic organic solvent. The hydrophilic organic solvent may be a mixed solvent of a plurality of hydrophilic organic solvents. The scope of "water" includes hot water. As such hot water, for example, hot water with a temperature of 95° C. or higher can be used. Examples of the hydrophilic organic solvent include at least one alcohol (which may be a mixed solvent of a plurality of alcohols), and the alcohol is preferably, but not limited to, ethanol. In the case that a mixed solvent of alcohol and water is used as the extraction solvent, the mixing ratio is preferably in the range of 10:90 to 90:10, and more preferably in the range of 20:80 to 50:50, for example, at a weight ratio, though the mixing ratio is not limited thereto. In one or more embodiments of the present invention, the extraction solvent is preferably water or a mixed solvent of water and a hydrophilic organic solvent, and water is particularly preferable.

Further, supercritical carbon dioxide can be used as the extraction solvent.

The extraction method to obtain the turmeric extract from the plant material is not limited.

In one or more embodiments of the present invention, for the turmeric extract, use of a turmeric extract comprising at least one of turmeronol A, turmeronol B, and bisacurone and extracted with the above extraction solvent is preferable, use of a turmeric extract comprising at least turmeronol A and turmeronol B and extracted with the above extraction solvent is more preferable, and use of a turmeric extract comprising turmeronol A, turmeronol B, and bisacurone and extracted with the above extraction solvent is further preferable.

Turmeronol A and turmeronol B are each a compound having a planar structure shown below.

[Formula 1]

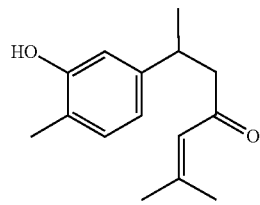

Turmeronol A

[Formula 2]

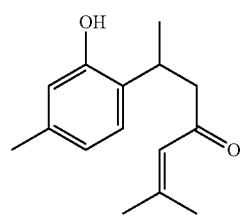

Turmeronol B

In turmeronol A and turmeronol B in a naturally-occurring substance separated from turmeric, the configuration of the carbon at position 6 of the partial structure 2-methyl-2-hepten-4-one is S configuration. In one or more embodiments of the present invention, however, it is sufficient for each of turmeronol A and turmeronol B to have the corresponding planar structure shown above, and the configuration may be S configuration, R configuration, or a mixture of S and R configurations.

In one or more embodiments of the present invention, bisacurone is a compound having a planar structure shown below. Bisacurone has an asymmetric carbon at the position indicated with the symbol * in the formula of the planar structure, and there may be multiple optical isomers of bisacurone. In one or more embodiments of the present invention, bisacurone may be any optical isomer thereof, or a mixture of two or more optical isomers thereof.

[Formula 3]

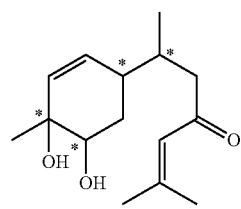

<Turmeronol A, Turmeronol B, and Bisacurone>

At least one of turmeronol A, turmeronol B, and bisacurone (also referred to as the "active compound") for use in one or more embodiments of the present invention may be originated from a plant, or artificially synthesized. For example, optically active (+)-turmeronol A can be synthesized with a method described in Biosci Biotechnol Biochem. 1993; 57(7): 1137-40.

In one or more embodiments of the present invention, it is sufficient for each of turmeronol A, turmeronol B, and bisacurone to have the corresponding planar structure shown above. Each of turmeronol A, turmeronol B, and bisacurone may be any optical isomer thereof, or a mixture of a plurality of optical isomers thereof.

The active compound for use in one or more embodiments of the present invention is more preferably originated from a plant material, and further preferably originated from a plant of the genus *Curcuma* in the family Zingiberaceae. Specific examples of plants of the genus *Curcuma* in the family Zingiberaceae and parts thereof are as described above. The active compound can be obtained from a part, such as a rhizome, of a plant of the genus *Curcuma* in the family Zingiberaceae.

The active compound can be extracted from a plant material containing it. The extraction method is as described above. The active compound may be in the form of a plant extract, in particular, a turmeric extract extracted with at least one extraction solvent selected from the group consisting of water and a hydrophilic organic solvent.

Alternatively, a fraction of the active compound highly purified from a plant extract containing the active compound may be used in one or more embodiments of the present invention, and such a fraction may be blended in the composition of one or more embodiments of the present invention. For example, the active compound can be highly purified in an ethyl acetate fraction by subjecting a plant extract containing the active compound to liquid-liquid distribution using ethyl acetate/water. Alternatively, a plant extract containing the active compound or a fraction thereof may be subjected to a purification process via chromatography to obtain the active compound as a highly purified product. Examples of chromatography techniques that can be employed include reversed-phase column chromatography and normal-phase thin-layer chromatography.

A plant extract containing the active compound or a fraction thereof may be subjected to processing, such as dehydration, pulverization, granulation, and solubilization, in accordance with a conventional technique.

The active compound preferably contains at least turmeronol A and turmeronol B, and more preferably contains turmeronol A, turmeronol B, and bisacurone.

<Composition for Inhibiting TNF-α or IL-6 Production>

The composition of one or more embodiments of the present invention for inhibiting TNF-α or IL-6 production has an effect of inhibiting production of one of, preferably, both of TNF-α and IL-6.

The subject of the composition of one or more embodiments of the present invention for inhibiting TNF-α or IL-6 production is typically a human, but is not limited to humans and may be any other non-human animal, such as a mammal other than humans.

The subject of the composition of one or more embodiments of the present invention for inhibiting TNF-α or IL-6 production is preferably a subject in need of inhibiting production of one or both of TNF-α and IL-6 or for whom inhibiting TNF-α or IL-6 production is desirable, and more preferably a human with 0.3 mg/dL or less of blood CRP (c-reactive protein). High levels of blood CRP are known to relate to exacerbation of arteriosclerosis and the risk of cardiovascular diseases. Non Patent Literature 3 discloses that 0.3 mg/dL of blood CRP is the lower limit of detection sensitivity achieved by conventional measurement methods for blood CRP. Humans with 0.3 mg/dL or less of blood CRP can be classified as healthy humans. Healthy humans are humans not affected by any of diseases including chronic inflammation, acute inflammation, arteriosclerosis, and cardiovascular diseases. Measurement methods for blood CRP with higher sensitivity (high-sensitivity CRP) can separate healthy humans with 0.3 mg/dL or less of blood CRP to classify those with 0.1 mg/dL to 0.3 mg/dL of blood CRP as having moderate risk of the above diseases and those with less than 0.1 mg/dL of blood CRP as having low risk of the diseases. Thus, inhibiting one or both of TNF-α and IL-6, which are risk factors for the diseases, is desirable because there can be humans with moderate risk of the above diseases even among healthy humans with 0.3 mg/dL or less of blood CRP. The blood CRP of a human as the subject of the composition of one or more embodiments of the present invention for inhibiting TNF-α or IL-6 production is 0.02 mg/dL or more in normal cases, preferably 0.09 mg/dL or more, and more preferably 0.1 mg/dL or more. Measurement of blood CRP can be carried out with a method described in Examples. The composition of one or more embodiments of the present invention for inhibiting TNF-α or IL-6 production is effective even for healthy subjects.

The composition of one or more embodiments of the present invention for inhibiting TNF-α or IL-6 production is preferably used for inhibiting systemic production of TNF-α or IL-6 in an animal as the subject. Inhibiting systemic production of TNF-α or IL-6 means decreasing concentration of TNF-α or IL-6 in blood or inhibiting the increase of the concentration. For example, inhibiting systemic production of TNF-α or IL-6 means decreasing concentration of TNF-α or IL-6 in the blood of the subject or inhibiting the increase of the concentration after the composition of one or more embodiments of the present invention for inhibiting TNF-α or IL-6 production is ingested or administered via oral or transnasal administration. The composition of one or more embodiments of the present invention for inhibiting TNF-α or IL-6 production is preferably used for treating or preventing a disease or symptom that is ameliorated by inhibiting production of TNF-α or IL-6 in an animal as the subject.

The composition of one or more embodiments of the present invention for inhibiting TNF-α or IL-6 production may be a composition in the form of, for example, a pharmaceutical product, a food or beverage product, a feed, a food additive, or a feed additive, and is preferably in the form of a pharmaceutical product or a food or beverage product. Food or beverage product compositions include forms of foods with functional claims, foods for specified health use, and nutritional supplements. The composition of one or more embodiments of the present invention for inhibiting TNF-α or IL-6 production may be a composition for use in medical applications (e.g., a pharmaceutical product), or a composition for use in nonmedical applications (e.g., a food or beverage product, a feed, a food additive, a feed additive).

The composition of one or more embodiments of the present invention for inhibiting TNF-α or IL-6 production is preferably in the form of a composition that is ingested or administered via oral or transnasal administration, and is more preferably in the form of a composition that is ingested or administered via oral administration.

In one or more embodiments of the present invention, the term "daily intake" is used to mean the total amount of the composition of one or more embodiments of the present invention that is ingested or administered per day, and is used to preferably mean the total amount of the composition of one or more embodiments of the present invention that is ingested by or administered to one human, in particular, one adult human, per day. A specific example of the "daily intake" of the composition of one or more embodiments of the present invention when ingested or administered via oral or transnasal administration, preferably via oral administration, is 0.1 g to 500 g as the amount of the composition of one or more embodiments of the present invention. The composition of one or more embodiments of the present invention may be ingested or administered continuously, or ingested or administered when needed.

The shape of the composition of one or more embodiments of the present invention is not limited, and may be, for example, any shape such as liquid, fluid, gel, semi-solid, and solid.

The composition of one or more embodiments of the present invention may further comprise at least one additional component, in addition to the above active compound or the above turmeric extract. Preferable examples of the at least one additional component that may be comprised in the composition of one or more embodiments of the present invention include, but are not limited to, components that are acceptable in the final form, such as a pharmaceutical product, a food or beverage product, a feed, a food additive, and a feed additive, and are orally ingestible.

Examples of the additional component include sweeteners, acidulants, vitamins, minerals, thickeners, emulsifiers, antioxidants, and water. According to need, a pigment, an aroma chemical, a preservative, an antiseptic agent, a fungicide, or an additional physiologically active substance or the like may be added.

Examples of sweeteners include: monosaccharides and disaccharides, such as glucose, fructose, sucrose, lactose, maltose, palatinose, trehalose, and xylose; isomerized glucose syrup (e.g., glucose-fructose syrup, fructose-glucose syrup, and an isomerized sugar mixture), sugar alcohols (e.g., erythritol, xylitol, lactitol, Palatinit, sorbitol, and reduced starch syrup), honey, and high-intensity sweeteners (e.g., sucralose, acesulfame potassium, thaumatin, *stevia*, and aspartame).

Examples of acidulants include citric acid, malic acid, gluconic acid, tartaric acid, lactic acid, phosphoric acid, and salts thereof. One of these or two or more thereof can be used.

Examples of vitamins include vitamin A, vitamin B1, vitamin B2, vitamin B6, vitamin E, niacin, and inositol.

Examples of minerals include calcium, magnesium, zinc, and iron.

Examples of thickeners include carrageenan, gellan gum, xanthan gum, gum Arabic, tamarind gum, guar gum, Locust bean gum, karaya gum, agar, gelatin, pectin, soybean polysaccharides, and carboxymethyl cellulose (CMC).

Examples of emulsifiers include glycerin fatty acid ester, sucrose fatty acid ester, sorbitan fatty acid ester, lecithin, plant sterol, and saponin.

Examples of antioxidants include vitamin C, tocopherol (vitamin E), and enzyme-treated rutin.

The additional components can be adequately blended in such amounts that those skilled in the art generally employ for compositions for food or beverage products, pharmaceutical products, or others.

The composition of one or more embodiments of the present invention for inhibiting TNF-α or IL-6 production preferably comprises only the active compound or the turmeric extract as an active component involved in inhibiting TNF-α or IL-6 production. In this case, the composition of one or more embodiments of the present invention for inhibiting TNF-α or IL-6 production may comprise any additional component, as described above, that is not involved in inhibiting TNF-α or IL-6 production.

In one or more embodiments of the present invention, the form of the composition formulated with the above active compound or the above turmeric extract and at least one additional component by an adequate means may be the form of any of solid compositions including powders, granules, capsules, and tablets (including coated tablets such as sugar-coated tablets, multilayer tablets, orally disintegrating tablets, and chewable tablets), or the form of any of liquid compositions including solutions.

<Composition Comprising at Least One of Turmeronol A, Turmeronol B, and Bisacurone, for Inhibiting TNF-α or IL-6 Production>

The content of the above active compound or the above turmeric extract comprising it in the composition of one or more embodiments of the present invention for inhibiting TNF-α or IL-6 production is not limited, and may be any content effective for inhibiting TNF-α or IL-6 production.

The composition for inhibiting TNF-α or IL-6 production according to one or more embodiments of the present invention comprises preferably 20 μg or more, more preferably 37 μg or more, particularly preferably 55 μg or more, further preferably 74 μg or more, most preferably 100 μg or more of turmeronol A and turmeronol B in total per daily intake. In this case, the composition for inhibiting TNF-α or IL-6 production according to one or more embodiments of the present invention has particularly high effect of inhibiting TNF-α or IL-6 production. The upper limit of the total content of turmeronol A and turmeronol B is not limited, and the composition for inhibiting TNF-α or IL-6 production according to one or more embodiments of the present invention comprises typically 1100 μg or less, preferably 550 μg or less, more preferably 330 μg or less, particularly preferably 220 μg or less, further preferably 170 μg or less, most preferably 125 μg or less of turmeronol A and turmeronol B in total per daily intake. If at least one of turmeronol A and turmeronol B in the composition for inhibiting TNF-α or IL-6 production according to one or more embodiments of the present invention is in the form of a turmeric extract comprising it, it is preferable for the composition to comprise the turmeric extract in such a manner that the total amount of turmeronol A and turmeronol B falls within the above range.

If the composition for inhibiting TNF-α or IL-6 production according to one or more embodiments of the present invention comprises a turmeric extract comprising at least one of turmeronol A, turmeronol B, and bisacurone, the turmeric extract in the composition may comprise preferably 20 μg or more, more preferably 37 μg or more, particularly preferably 55 μg or more, further preferably 74 μg or more, most preferably 100 μg or more of turmeronol A and turmeronol B in total per daily intake. The upper limit of the total content of turmeronol A and turmeronol B in the turmeric extract is not limited, and the total content may be 1100 μg or less, preferably 550 μg or less, more preferably 330 μg or less, particularly preferably 220 μg or less, further preferably 170 μg or less, and most preferably 125 μg or less per daily intake.

The composition for inhibiting TNF-α or IL-6 production according to one or more embodiments of the present invention comprises preferably 17 μg or more, more preferably 28 μg or more, particularly preferably 43 μg or more, further preferably 57 μg or more, most preferably 77 μg or more of turmeronol A per daily intake. In this case, the composition for inhibiting TNF-α or IL-6 production according to one or more embodiments of the present invention has particularly high effect of inhibiting TNF-α or IL-6 production. The upper limit of the content of turmeronol A is not limited, and the composition for inhibiting TNF-α or IL-6 production according to one or more embodiments of the present invention comprises typically 900 μg or less, preferably 430 μg or less, more preferably 260 μg or less, particularly preferably 175 μg or less, further preferably 130 μg or less, most preferably 95 μg or less of turmeronol A per daily intake. If turmeronol A in the composition for inhibiting TNF-α or IL-6 production according to one or more embodiments of the present invention is in the form of a turmeric extract comprising it, it is preferable for the composition to comprise the turmeric extract in such a manner that the amount of turmeronol A falls within the above range.

If the composition for inhibiting TNF-α or IL-6 production according to one or more embodiments of the present invention comprises a turmeric extract comprising at least one of turmeronol A, turmeronol B, and bisacurone, the turmeric extract in the composition may comprise preferably 17 μg or more, more preferably 28 μg or more, particularly preferably 43 μg or more, further preferably 57 μg or more, most preferably 77 μg or more of turmeronol A per daily intake. The upper limit of the content of turmeronol A in the turmeric extract is not limited, and the content may be typically 900 μg or less, preferably 430 μg or less, more preferably 260 μg or less, particularly preferably 175 μg or less, further preferably 130 μg or less, and most preferably 95 μg or less per daily intake.

The composition for inhibiting TNF-α or IL-6 production according to one or more embodiments of the present invention comprises preferably 5 μg or more, more preferably 8 μg or more, particularly preferably 12 μg or more, further preferably 16 μg or more, most preferably 22 μg or more of turmeronol B per daily intake. In this case, the composition for inhibiting TNF-α or IL-6 production according to one or more embodiments of the present invention has particularly high effect of inhibiting TNF-α or IL-6 production. The upper limit of the content of turmeronol B is not limited, and the composition for inhibiting TNF-α or IL-6 production according to one or more embodiments of the present invention comprises typically 250 μg or less, preferably 123 μg or less, more preferably 74 μg or less, particularly preferably 50 μg or less, further preferably 37 μg or less, most preferably 27 μg or less of turmeronol B per daily intake. If turmeronol B in the composition for inhibiting TNF-α or IL-6 production according to one or more embodiments of the present invention is in the form of a turmeric extract comprising it, it is preferable for the composition to comprise the turmeric extract in such a manner that the amount of turmeronol B falls within the above range.

If the composition for inhibiting TNF-α or IL-6 production according to one or more embodiments of the present invention comprises a turmeric extract comprising at least one of turmeronol A, turmeronol B, and bisacurone, the turmeric extract in the composition may comprise preferably 5 μg or more, more preferably 8 μg or more, particularly preferably 12 μg or more, further preferably 16 μg or more, most preferably 22 μg or more of turmeronol B per daily intake. The upper limit of the content of turmeronol B in the turmeric extract is not limited, and the content may be typically 250 μg or less, preferably 123 μg or less, more preferably 74 μg or less, particularly preferably 50 μg or less, further preferably 37 μg or less, and most preferably 27 μg or less per daily intake.

The composition for inhibiting TNF-α or IL-6 production according to one or more embodiments of the present invention comprises preferably 80 μg or more, more preferably 133 μg or more, particularly preferably 200 μg or more, further preferably 267 μg or more, most preferably 360 μg or more of bisacurone per daily intake. In this case, the composition for inhibiting TNF-α or IL-6 production according to one or more embodiments of the present invention has particularly high effect of inhibiting TNF-α or IL-6 production. The upper limit of the content of bisacurone is not limited, and the composition for inhibiting TNF-α or IL-6 production according to one or more embodiments of the present invention comprises typically 4000 μg or less, preferably 2000 μg or less, more preferably 1200 μg or less, particularly preferably 800 μg or less, further preferably 600 μg or less, most preferably 440 μg or less of bisacurone per daily intake. If bisacurone in the composition for inhibiting TNF-α or IL-6 production according to one or more embodiments of the present invention is in the form of a turmeric extract comprising it, it is preferable for the composition to comprise the turmeric extract in such a manner that the amount of bisacurone falls within the above range.

If the composition for inhibiting TNF-α or IL-6 production according to one or more embodiments of the present invention comprises a turmeric extract comprising at least one of turmeronol A, turmeronol B, and bisacurone, the turmeric extract in the composition may comprise preferably 80 μg or more, more preferably 133 μg or more, particularly preferably 200 μg or more, further preferably 267 μg or more, most preferably 360 μg or more of bisacurone per daily intake. The upper limit of the content of bisacurone in the turmeric extract is not limited, and the content may be typically 4000 μg or less, preferably 2000 μg or less, more preferably 1200 μg or less, particularly preferably 800 μg or less, further preferably 600 μg or less, and most preferably 440 μg or less per daily intake.

In the composition for inhibiting TNF-α or IL-6 production according to one or more embodiments of the present invention, the content of curcumin is typically less than 30 mg, preferably 5 mg or less, more preferably 2.5 mg or less, particularly preferably 1.5 mg or less, further preferably 1 mg or less, still further preferably 700 μg or less, and most preferably 520 μg or less per daily intake. In this case, the composition for inhibiting TNF-α or IL-6 production according to one or more embodiments of the present invention has particularly high effect of inhibiting TNF-α or IL-6 production.

If the composition for inhibiting TNF-α or IL-6 production according to one or more embodiments of the present invention comprises a turmeric extract comprising at least one of turmeronol A, turmeronol B, and bisacurone, the content of curcumin in the turmeric extract in the composition may be typically less than 30 mg, preferably 5 mg or less, more preferably 2.5 mg or less, particularly preferably 1.5 mg or less, further preferably 1 mg or less, furthermore preferably 700 μg or less, and most preferably 520 μg or less per daily intake.

The composition for inhibiting TNF-α or IL-6 production according to one or more embodiments of the present invention is preferably a composition that is continuously ingested, specifically, a composition that is continuously ingested at a frequency of once or twice or more per day, preferably over 4 weeks or more, more preferably over 8 weeks or more, most preferably over 12 weeks or more.

The composition for inhibiting TNF-α or IL-6 production according to one or more embodiments of the present invention may be the above active compound or the above turmeric extract comprising it, per se, or a composition comprising the active compound or the turmeric extract comprising it and at least one additional component. When the composition of one or more embodiments of the present invention comprises the above active compound or the above turmeric extract comprising it and at least one additional component, the composition may be a composition obtained by mixing the above active compound or the above turmeric extract comprising it and at least one additional component, or a composition obtained by formulating with the active compound or the turmeric extract comprising it and at least one additional component by an adequate means, or a composition obtained by mixing a composition obtained by formulating with the active compound or the turmeric extract comprising it and at least one additional component with another additional component.

<Method for Inhibiting TNF-α or IL-6 Production by Administration of at Least One of Turmeronol A, Turmeronol B, and Bisacurone>

A further aspect of one or more embodiments of the present invention relates to a method for inhibiting TNF-α or IL-6 production, comprising:

administering at least one of turmeronol A, turmeronol B, and bisacurone, or a turmeric extract comprising at least one of turmeronol A, turmeronol B, and bisacurone and extracted with at least one extraction solvent selected from the group consisting of water and a hydrophilic organic solvent, to a subject; and inhibiting TNF-α or IL-6 production in the subject.

The active compound or the turmeric extract for use in the method according to the present aspect can be in the aforementioned form of the composition according to one or more embodiments of the present invention.

In the method according to the present aspect, the meaning of "administering" the active compound or the turmeric extract to the subject encompasses that the subject voluntarily ingests the active compound or the turmeric extract, and that the active compound or the turmeric extract is administered to or ingested by the subject in compliance with instructions of a physician or a veterinarian.

The method according to the present aspect may be a medical method or a nonmedical method.

The subject in the method according to the present aspect is preferably a subject in need of inhibiting TNF-α or IL-6 production or for whom inhibiting TNF-α or IL-6 production is desirable. The subject in the method according to the present aspect is typically a human, but may be a mammal other than humans. The subject in the method according to the present aspect is preferably a human with 0.3 mg/dL or less of blood CRP, and more preferably a healthy human with 0.3 mg/dL or less of blood CRP. The subject is a human with 0.02 mg/dL or more of blood CRP in normal cases, and preferably, among healthy humans, a subject having relatively high risk of cardiovascular diseases, more preferably a human with 0.09 mg/dL or more of blood CRP, and particularly preferably a human with 0.1 mg/dL or more of blood CRP. Measurement of blood CRP can be carried out with a method described in Examples.

In the method according to the present aspect, the administration route is preferably oral or transnasal administration, and is particularly preferably oral administration. Preferably, the method according to the present aspect can inhibit systemic TNF-α or IL-6 production in the subject with administration. Inhibiting systemic production of TNF-α or IL-6 typically means decreasing concentration of TNF-α or IL-6 in the blood of the subject or inhibiting the increase of the concentration. The method according to the present aspect is a method for treating or preventing a disease or symptom that is ameliorated by inhibiting production of TNF-α or IL-6 in the subject.

In the method according to the present aspect, the amount of the active compound or the turmeric extract administered to the subject is not limited, and may be any amount effective for inhibiting TNF-α or IL-6 production. For example, in one embodiment, in the case that the subject is an adult human, it is preferable to administer the active compound or the turmeric extract to the subject, so that 20 µg or more of turmeronol A and turmeronol B in total can be administered to the subject per day. In another embodiment, in the case that the subject is an adult human, it is preferable to administer the active compound or the turmeric extract to the subject, so that 17 µg or more of turmeronol A can be administered to the subject per day. In another embodiment, in the case that the subject is an adult human, it is preferable to administer the active compound or the turmeric extract to the subject, so that 5 µg or more of turmeronol B can be administered to the subject per day. In another embodiment, in the case that the subject is an adult human, it is preferable to administer the active compound or the turmeric extract to the subject, so that 80 µg or more of bisacurone can be administered to the subject per day. Further, it is preferable to administer the active compound or the turmeric extract to the subject, so that the daily dose of curcumin can be less than 30 mg. Further preferably, it is preferable to administer the active compound or the turmeric extract to the subject, so that each component of the active compound can be administered to the subject per day at a weight that is described as a preferred amount for the component of the active compound in the daily intake of the composition for inhibiting TNF-α or IL-6 production according to one or more embodiments of the present invention.

EXAMPLES

1. Method for Production of Turmeric Extract

A turmeric extract was prepared by extracting the rhizome part of turmeric (*Curcuma longa*) with water, and heat-drying the resulting extract under reduced pressure to remove water. The amounts of turmeronol A (TA) and turmeronol B (TB) in the turmeric extract were measured by using LC/MS, and the amounts of bisacurone and curcumin were measured by using HPLC.

2. Test Food

The test food was a tablet comprising the turmeric extract containing, per three tablets, 86.5 µg of TA, 24.7 µg of TB, 400 µg of bisacurone, and 471 µg of curcumin. The tablet was prepared by mixing the turmeric extract, an excipient, a lubricant, a coloring agent, and other ingredients for manufacturing (fine grain silicon dioxide and sucrose fatty acid ester), and tableting the mixture.

The placebo food was a tablet prepared with replacing the turmeric extract in the test food with an excipient.

3. Method for Measuring Blood TNF-α and IL-6

TNF-α and IL-6 concentrations in blood were both measured with chemiluminescent enzyme immunoassay.

4. Evaluation Test for Amounts of Change in Blood TNF-α and IL-6

Eighty-five healthy 50- to 69-year-old male and female test subjects were randomly assigned to two groups (placebo group: 43 test subjects, turmeric extract group: 42 test subjects), and, under a double-blind test, allowed to ingest three tablets of the test food, which contained the turmeric extract, or the placebo food, which did not contain the extract, once a day before supper for 12 weeks. The blood TNF-α and IL-6 concentrations of the test subjects were measured before the intake of the test food or the placebo food, and 4 weeks, 8 weeks, and 12 weeks after the intake.

In the present test, blood CRP (c-reactive protein), which is an index of inflammation, in particular, of chronic inflammation, in the 85 test subjects was in the range of 0.02 mg/dL to 0.24 mg/dL at the initiation of the test, and the average value was 0.09 mg/dL. Blood CRP was measured with nephelometry and latex agglutination turbidimetry. Measurement with nephelometry was carried out in accordance with an N-Latex CRP II kit from Siemens Healthcare Diagnostics K.K. Measurement with latex agglutination turbidimetry was carried out in accordance with an IATRO CRP-EX kit from LSI Medience Corporation.

Figure 2:
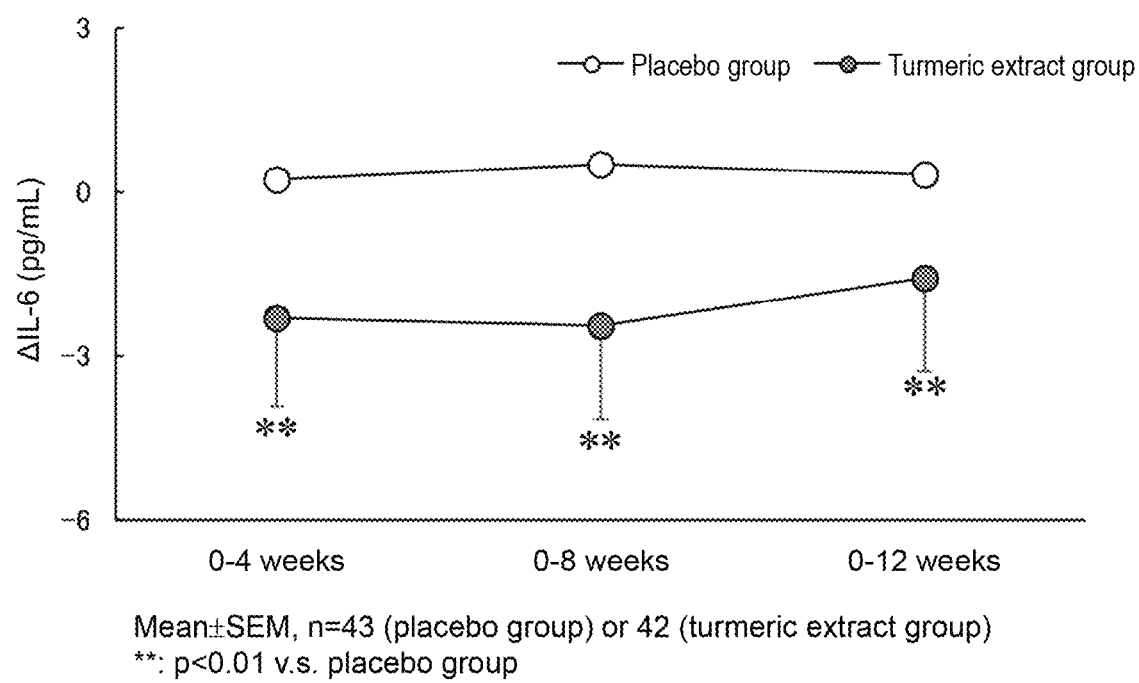
FIG. 2 shows amounts of change in blood IL-6 concentrations in a group with intake of a test food comprising a turmeric extract (turmeric extract group, n=42) and those in a group with intake of a placebo food (placebo group, n=43) from before the intake to 4 weeks, 8 weeks, and 12 weeks after the intake.

FIGS. 1 and 2 respectively show amounts of change in blood TNF-α concentrations (pg/mL) and amounts of change in blood IL-6 concentrations (pg/mL) from before the intake of the test food or the placebo food to 4 weeks, 8 weeks, and 12 weeks after the intake. As demonstrated in FIGS. 1 and 2, the levels of TNF-α and IL-6 in the turmeric extract group 4 weeks, 8 weeks, and 12 weeks after the initiation of intake of the test food were both significantly lower than those in the placebo group. These results revealed that intake of the turmeric extract decreases blood TNF-α concentration and blood IL-6 concentration.

All the publications, patents, and patent applications cited in the present description are incorporated herein by reference in their entirety.

The invention claimed is:

1. A method for inhibiting TNF-α or IL-6 production, comprising:
   administering turmeronol A and turmeronol B to a subject; and
   inhibiting TNF-α or IL-6 production in the subject,
   wherein the subject is a human with 0.3 mg/dL or less of blood c-reactive protein (CRP), and
   wherein the administering comprises administering 20 µg or more of turmeronol A and turmeronol B in total to the subject per day.

2. The method according to claim 1, wherein the method inhibits systemic production of TNF-α or IL-6 in the subject.

3. A method for inhibiting TNF-α or IL-6 production, comprising:
   administering turmeronol A to a subject, thereby inhibiting TNF-α or IL-6 production in the subject,
   wherein the subject is a human with 0.3 mg/dl or less of blood c-reactive protein (CRP), and
   wherein the administering comprises administering 17 µg or more of turmeronol A to the subject per day.

4. A method for inhibiting TNF-α or IL-6 production, comprising:
   administering turmeronol A and turmeronol B to a subject, thereby inhibiting TNF-α or IL-6 production in the subject,
   wherein the subject is a human with 0.3 mg/dl or less of blood c-reactive protein (CRP).

5. The method according to claim 1, wherein the administering further comprises administering bisacurone.

6. The method according to claim 1, wherein the subject is a human with 0.1 mg/dl or less of blood CRP.

7. The method according to claim 1, wherein the administering comprises administering from 43 µg to 175 µg turmeronol A and from 12 µg to 50 µg turmeronol B to the subject per day.

8. The method according to claim 1, wherein the administering comprises administering from 77 µg to 95 µg turmeronol A and from 22 µg to 27 µg turmeronol B to the subject per day.

9. The method according to claim 3, wherein the administering further comprises administering turmeronol B and bisacurone.

10. The method according to claim 3, wherein the method inhibits systemic production of TNF-α or IL-6 in the subject.

11. The method according to claim 3, wherein the subject is a human with 0.1 mg/dl or less of blood CRP.

12. The method according to claim 3, wherein the administering comprises administering from 43 μg to 175 μg turmeronol A to the subject per day.

13. The method according to claim 3, wherein the administering comprises administering from 77 μg to 95 μg turmeronol A to the subject per day.

14. The method according to claim 4, wherein the administering further comprises administering bisacurone.

15. The method according to claim 4, wherein the method inhibits systemic production of TNF-α or IL-6 in the subject.

16. The method according to claim 4, wherein the subject is a human with 0.1 mg/dl or less of blood CRP.

17. The method according to claim 4, wherein the administering comprises administering from 43 μg to 175 μg turmeronol A and from 12 μg to 50 μg turmeronol B to the subject per day.

18. The method according to claim 4, wherein the administering comprises administering from 77 μg to 95 μg turmeronol A and from 22 μg to 27 μg turmeronol B to the subject per day.

* * * * *